United States Patent
Liu

(10) Patent No.: US 10,342,383 B2
(45) Date of Patent: Jul. 9, 2019

(54) STOVE

(71) Applicant: Chia-Ming Liu, Douliou (TW)

(72) Inventor: Chia-Ming Liu, Douliou (TW)

(*) Notice: Subject to any disclaimer, the term of this patent is extended or adjusted under 35 U.S.C. 154(b) by 351 days.

(21) Appl. No.: 15/461,984

(22) Filed: Mar. 17, 2017

(65) Prior Publication Data
US 2018/0160848 A1   Jun. 14, 2018

(30) Foreign Application Priority Data
Dec. 12, 2016  (CN) .................... 2016 2 1356060 U

(51) Int. Cl.
*A47J 37/06*   (2006.01)
*A47J 37/07*   (2006.01)
*F24C 3/02*   (2006.01)
*A47J 37/04*   (2006.01)

(52) U.S. Cl.
CPC ......... *A47J 37/0704* (2013.01); *A47J 37/049* (2013.01); *A47J 37/067* (2013.01); *A47J 37/0713* (2013.01); *A47J 37/0786* (2013.01); *F24C 3/027* (2013.01)

(58) Field of Classification Search
CPC .... A47J 37/049; A47J 37/0682; A47J 37/067; A47J 37/0713; A47J 37/0709
USPC ......... 99/401, 422, 447, 450; 126/25 A, 154
See application file for complete search history.

(56) References Cited

U.S. PATENT DOCUMENTS 2,459,657 A * 1/1949 Klein .................... A47J 37/067
 126/41 R
3,386,432 A * 6/1968 Hauson ............... A47J 37/0682
 126/41 R

FOREIGN PATENT DOCUMENTS

EP  2143361 A1 * 1/2010 .......... A47J 37/0682

* cited by examiner

*Primary Examiner* — Reginald Alexander
(74) *Attorney, Agent, or Firm* — Burris Law, PLLC

(57) ABSTRACT

A stove includes a base seat, and a top seat disposed on the base seat. The top seat has a surrounding wall extending upwardly, a support member, and a grill grate. The surrounding wall has opposite first and second wall portions. The first wall portion defines a first groove. The second wall portion defines a second groove and a retaining groove below the second groove. The support member is disposed on the first wall portion below the first groove. The grill grate is disposed at one of a first position, where opposite lateral ends of the grill grate are respectively retained in the first and second grooves, and a second position, where one lateral end is placed on the support member while the other lateral end is retained in the retaining groove.

7 Claims, 6 Drawing Sheets

STOVE

CROSS-REFERENCE TO RELATED APPLICATION

This application claims priority of Chinese Patent Application No. 201621356060.8, filed on Dec. 12, 2016.

FIELD

The disclosure relates to a stove, and more particularly to a stove for grilling a food material.

BACKGROUND

Generally, when using a conventional stove for grilling, a food material is placed on a grill grate of the conventional stove, and a heating source (such as burned charcoal, a gas heater, or an infrared heater) is disposed at a bottom portion of a main body of the conventional stove under the grill grate for heating the food material.

However, since a distance between the heating source and the grill grate is fixed, when using charcoal as the heating source (which implies that the magnitude and uniformity of heating are not conveniently adjustable), the food material may be cooked unevenly. Furthermore, the conventional stove is incapable of smoking the food material.

SUMMARY

Therefore, an object of the disclosure is to provide a stove that can alleviate at least one of the drawbacks associated with the abovementioned prior art.

Accordingly, the stove includes a base seat, a top seat, and a heating unit. The base seat includes a seat body, and a plurality of wheels that are disposed on a bottom end of the seat body. The top seat is disposed on a top end portion of the seat body. The top seat has a bottom wall, a surrounding wall, a support member and a grill grate. The surrounding wall extends upwardly from a periphery of the bottom wall, cooperates with the bottom wall to define a receiving space that has an upper opening. The surrounding wall has a first wall portion and a second wall portion. The first wall portion has a top segment that defines a first groove. The second wall portion is opposite to the first wall portion. The second wall portion has a top segment defining a second groove, and a lower segment defining a retaining groove that is disposed below the second groove, and that opens toward the first wall portion. The support member is disposed on the first wall portion of the surrounding wall at a position below the first groove and corresponding in height to the retaining groove. The grill grate is disposed at one of a first position, where the grill grate is distal from the bottom wall, and where opposite lateral ends of the grill grate are respectively retained in the first and second grooves, and a second position, where the grill grate is proximate to the bottom wall, and where one of the lateral ends of the grill grate is placed on the support member while the other one of the lateral ends of the grill grate is retained in the retaining groove. The heating unit is disposed immovably on the top seat and proximate to the bottom wall.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
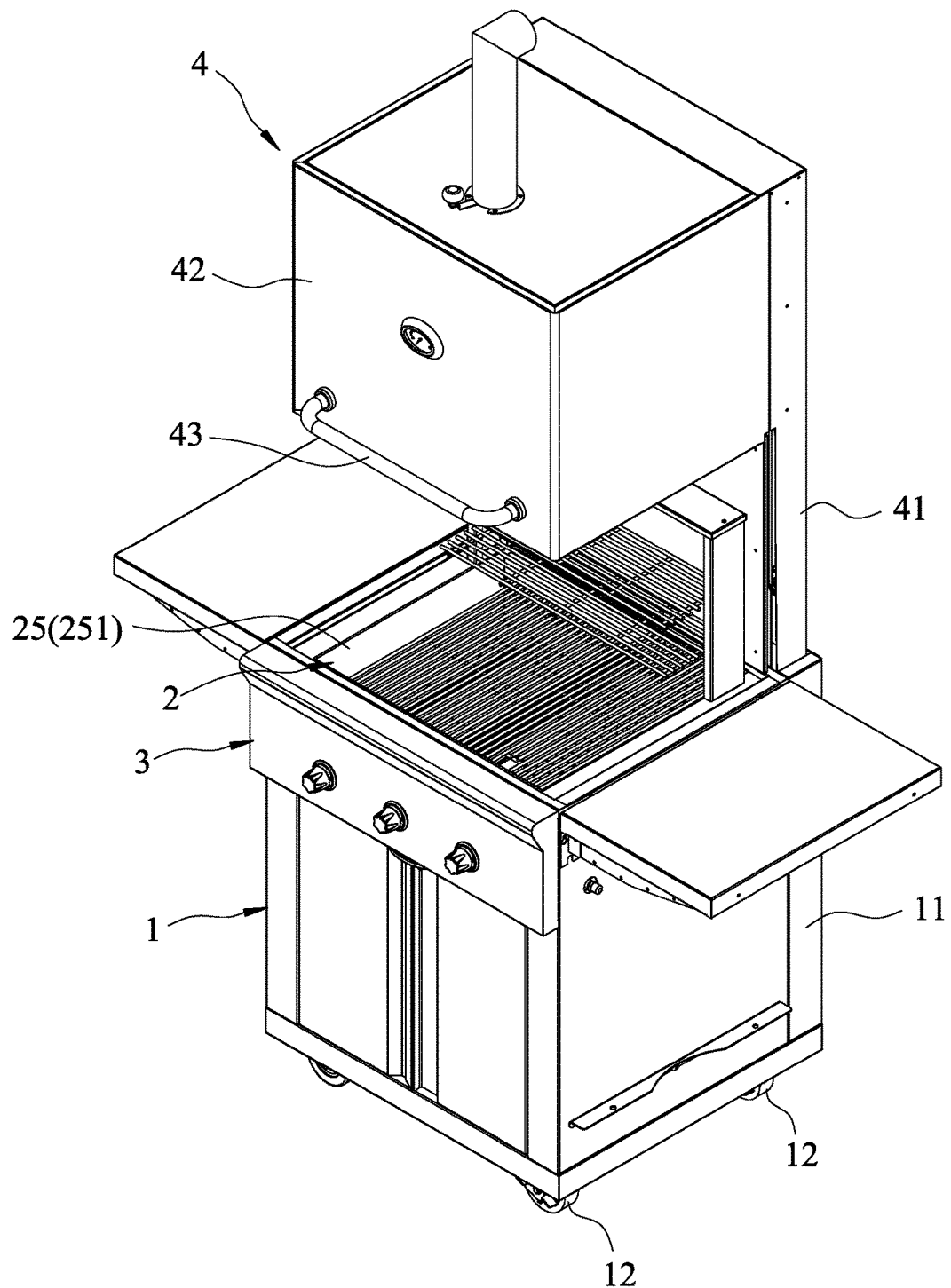
FIG. 1 is a perspective view of an embodiment of a stove according to the present disclosure, illustrating a top cover thereof at a lifted position.
Figure 2:
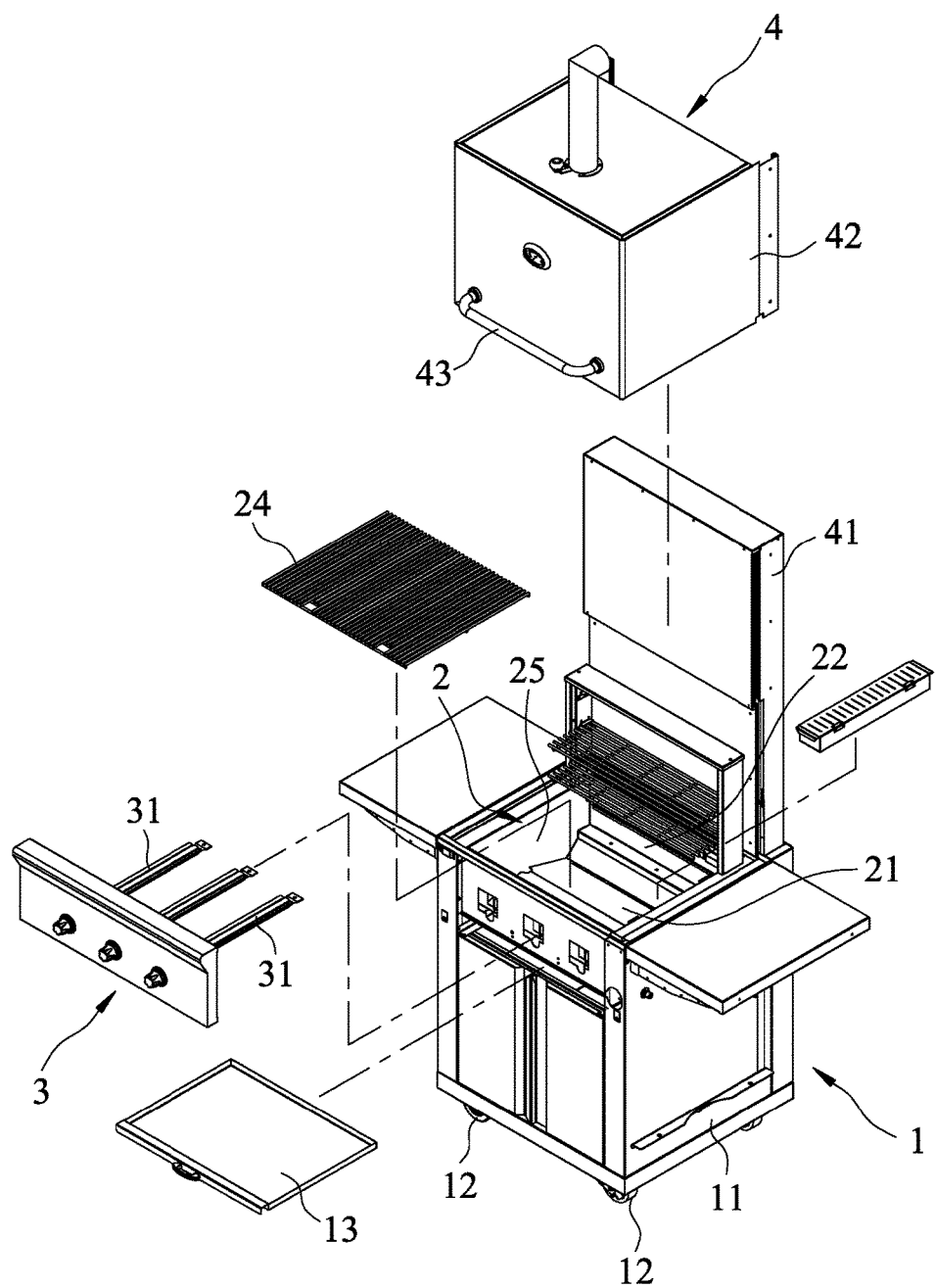
FIG. 2 is an exploded perspective view of the embodiment.

Referring to FIGS. 1 and 2, an embodiment of a stove according to the disclosure includes a base seat 1, a top seat 2, a heating unit 3, and a cover unit 4.

The base seat 1 includes a seat body 11, a plurality of wheels 12 disposed on a bottom end of the seat body 11, and an oil-collecting tray 13 removably disposed on the seat body 11.

Figure 3:
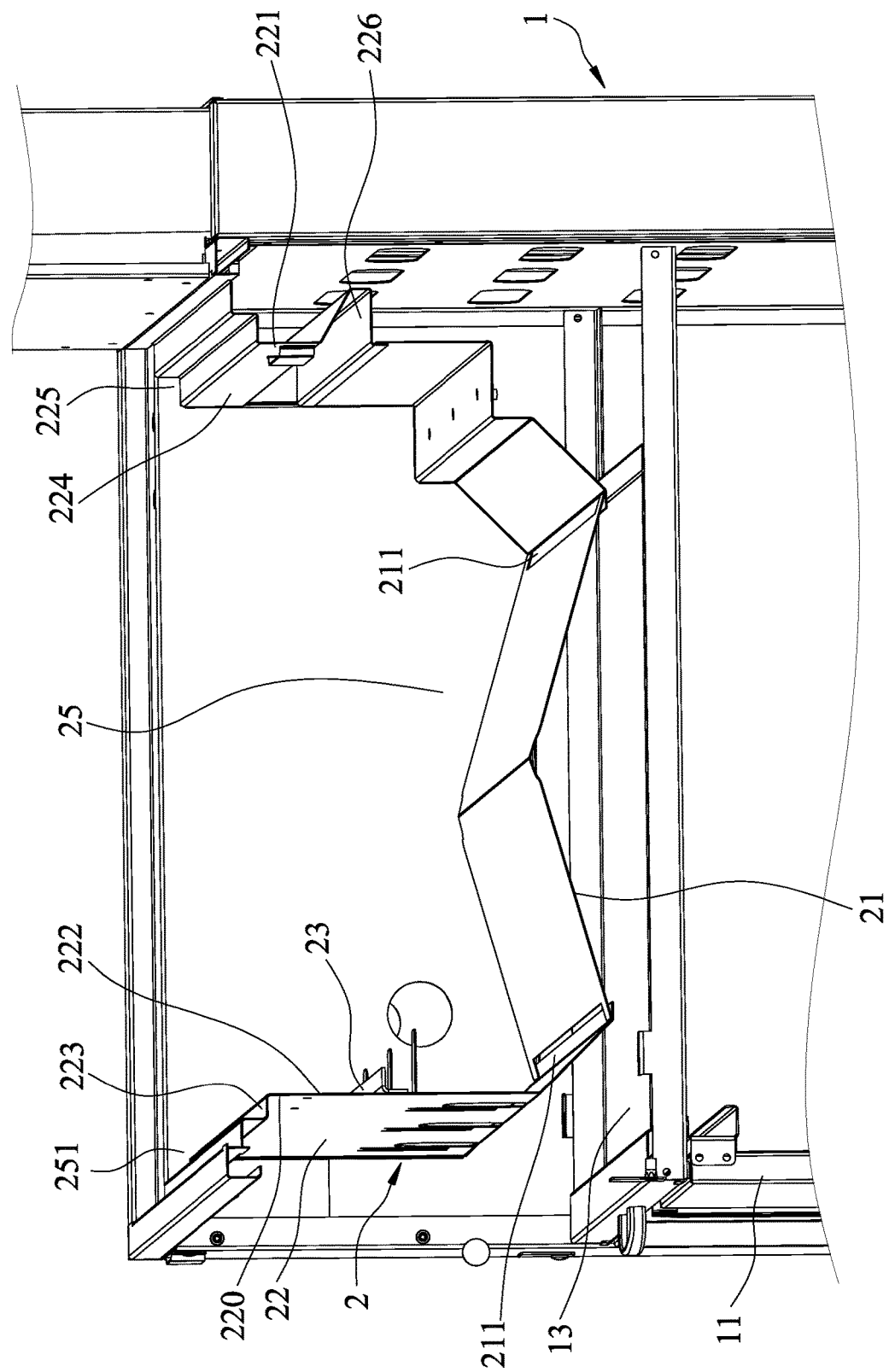
FIG. 3 is a fragmentary perspective view of a top seat of the embodiment.
Figure 4:
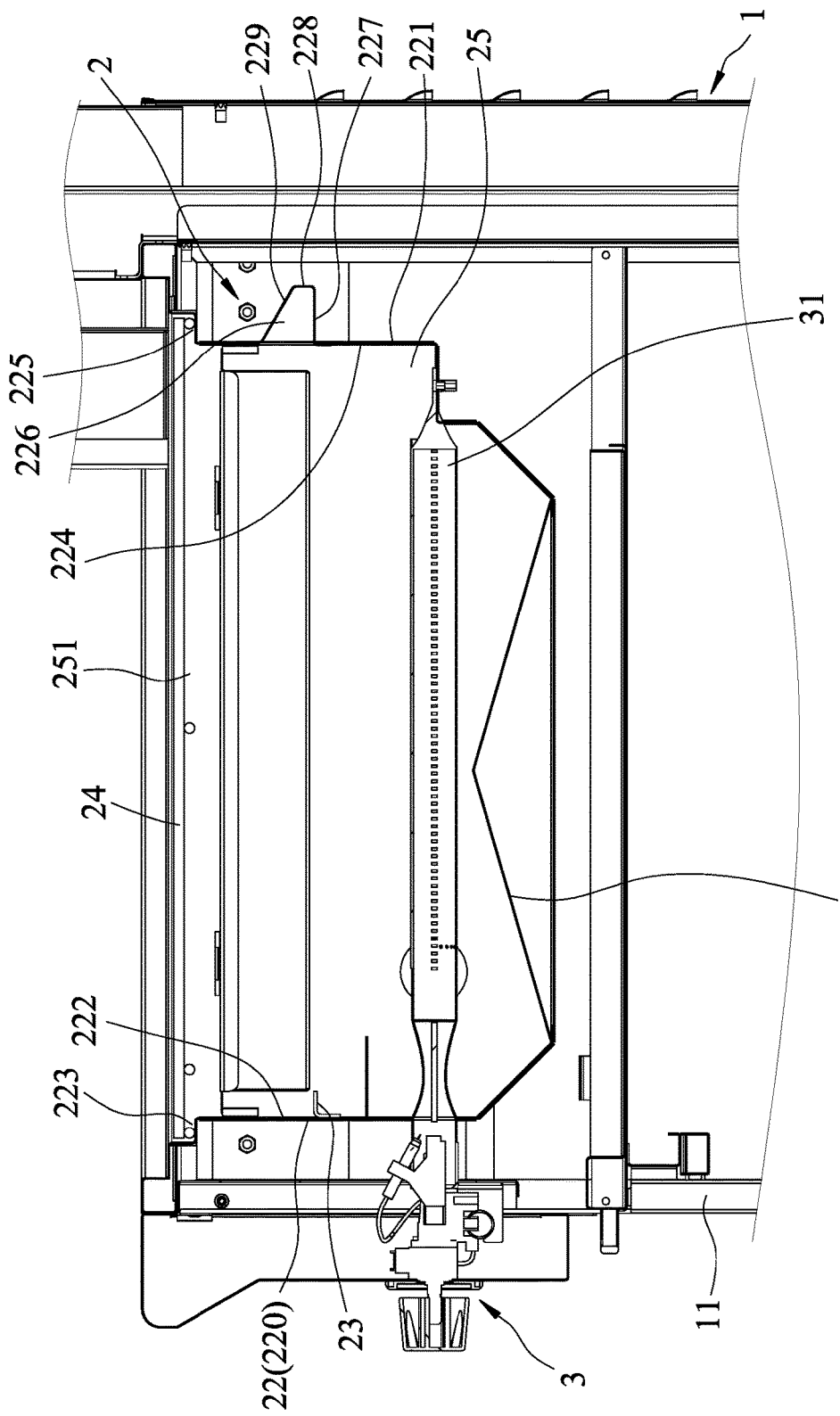
FIG. 4 is a fragmentary sectional view, illustrating a grill grate of the embodiment at a first position.

Referring to FIGS. 2 to 4, the top seat 2 is disposed on a top end portion of the seat body 11. The top seat 2 has a bottom wall 21, a surrounding wall 22, a support member 23, and a grill grate 24. The surrounding wall 22 extends upwardly from a periphery of the bottom wall 21, and cooperates with the bottom wall 21 to define a receiving space 25 that has an upper opening 251. In this embodiment, the bottom wall 21 is inverted v-shaped, and is formed with two oil-dripping holes 211 that are in spatial communication with the receiving space 25, and that are respectively formed in opposite lateral end portions of the bottom wall 21. The oil-collecting tray 13 is disposed under the bottom wall 21 of the top seat 2 for collecting oil that is dripped down from the receiving space 25 through the oil-dripping holes 211.

The surrounding wall 22 has a first wall portion 220, a second wall portion 221 opposite to the first wall portion 220. The first wall portion 220 has a top segment that defines a first groove 223, and a first inner surface 222 having a portion that extends through the top segment of the first wall portion 220 and that faces the first groove 223. The second wall portion 221 has a top segment that defines a second groove 225, and a lower segment that defines a retaining groove 226 disposed below the second groove 225 and opening toward the first wall portion 220. The second wall portion 221 further has second inner surface 224 having a top portion that extends through the top segment of the second wall portion 221, and that faces the second groove 225. The second inner surface 224 further has a lower portion that extends through the lower segment of the second wall portion 221, and that faces the retaining groove 226.

The support member 23 is disposed on the first inner surface 222 of the first wall portion 220 of the surrounding wall 22 at a position below the first groove 223, and corresponds in height to the retaining groove 226.

The lower portion of the second inner surface 224 has a lower surface section 227 configured as a lower boundary of the retaining groove 226, a lateral surface section 228 configured as a lateral boundary of the retaining groove 226, and an upper surface section 229 configured as an upper boundary of the retaining groove 226. The upper surface section 229 is inclined, and has an inner end and an outer end that is lower than the inner end (i.e. the upper surface section 229 is inclined downwardly from the inner end to the outer end).

Figure 5:
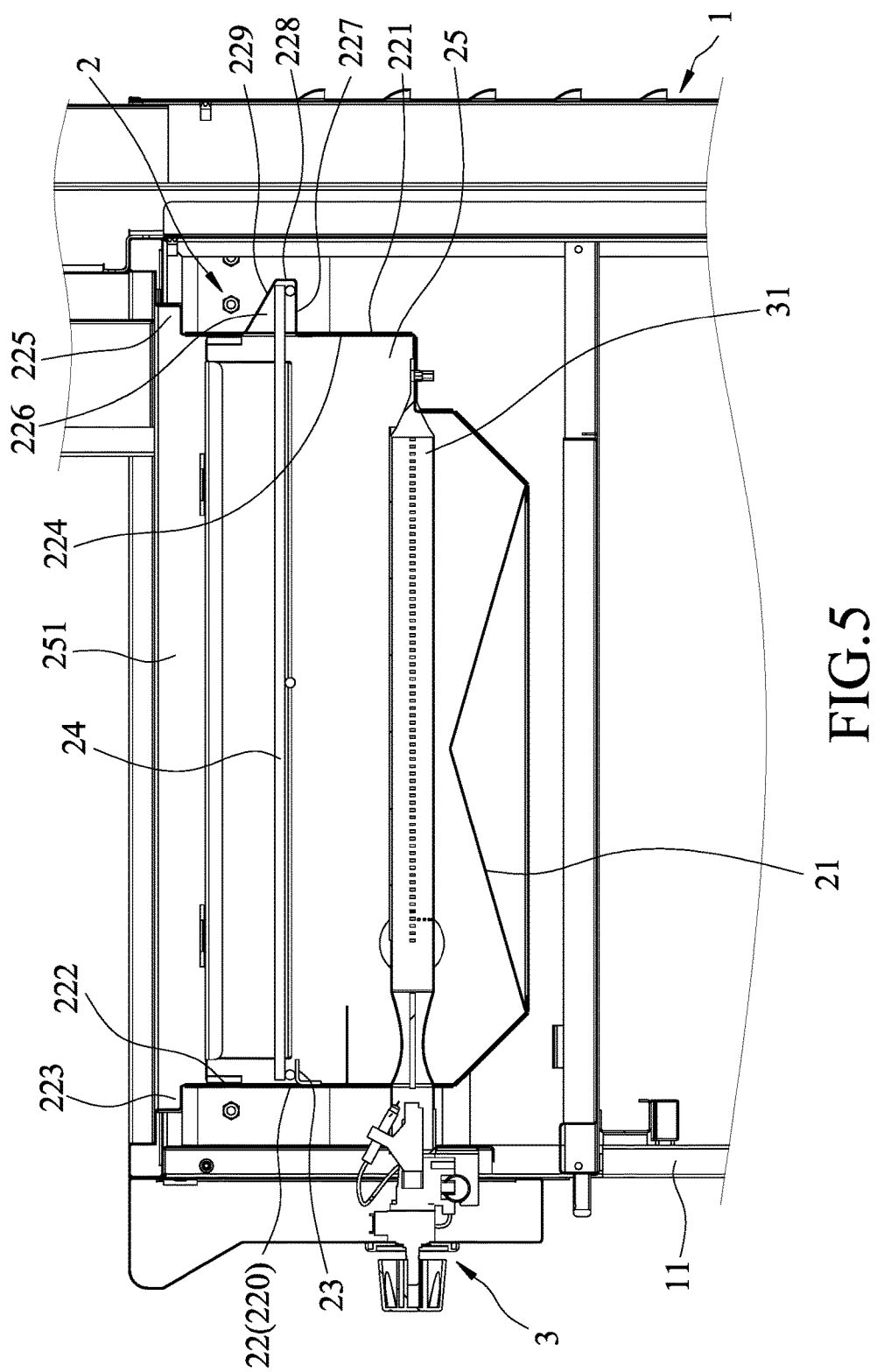
FIG. 5 is a view similar to FIG. 4, but illustrating the grill grate at a second position.

Referring to FIGS. 4 and 5, the grill grate 24 is disposed at one of a first position and a second position. When the grill grate 24 is at the first position (see FIG. 4), the grill grate 24 is distal from the bottom wall 21, and opposite lateral ends of the grill grate 24 are respectively retained in the first and second grooves 223, 225. When the grill grate 24 is at the second position (see FIG. 5), the grill grate 24 is proximate to the bottom wall 21, and one of the lateral ends of the grill grate 24 is placed on the support member 23 while the other one of the lateral ends of the grill grate 24 is retained in the retaining groove 226. Due to a structural design of the upper surface section 229 that is inclined downwardly from the inner end thereof to the outer end thereof, the other one of the lateral ends of the grill grate 24 can be placed in the retaining groove 226 in a relatively easy way.

Referring to FIGS. 2, 4 and 5, the heating unit 3 is disposed immovably on the top seat 1, and is proximate to the bottom wall 21 of the top seat 2. In this embodiment, the heating unit 3 has three gas tubings 31 disposed in the receiving space 25 and under the grill grate 24. Since the grill grate 24 can be disposed at a selected one of the first and second positions, a distance between the grill grate 24 and the gas tubings 31 can be adjusted to meet a user's requirement, such that a grilling process of a food material is easier to control in comparison with the aforesaid conventional stove.

Figure 6:
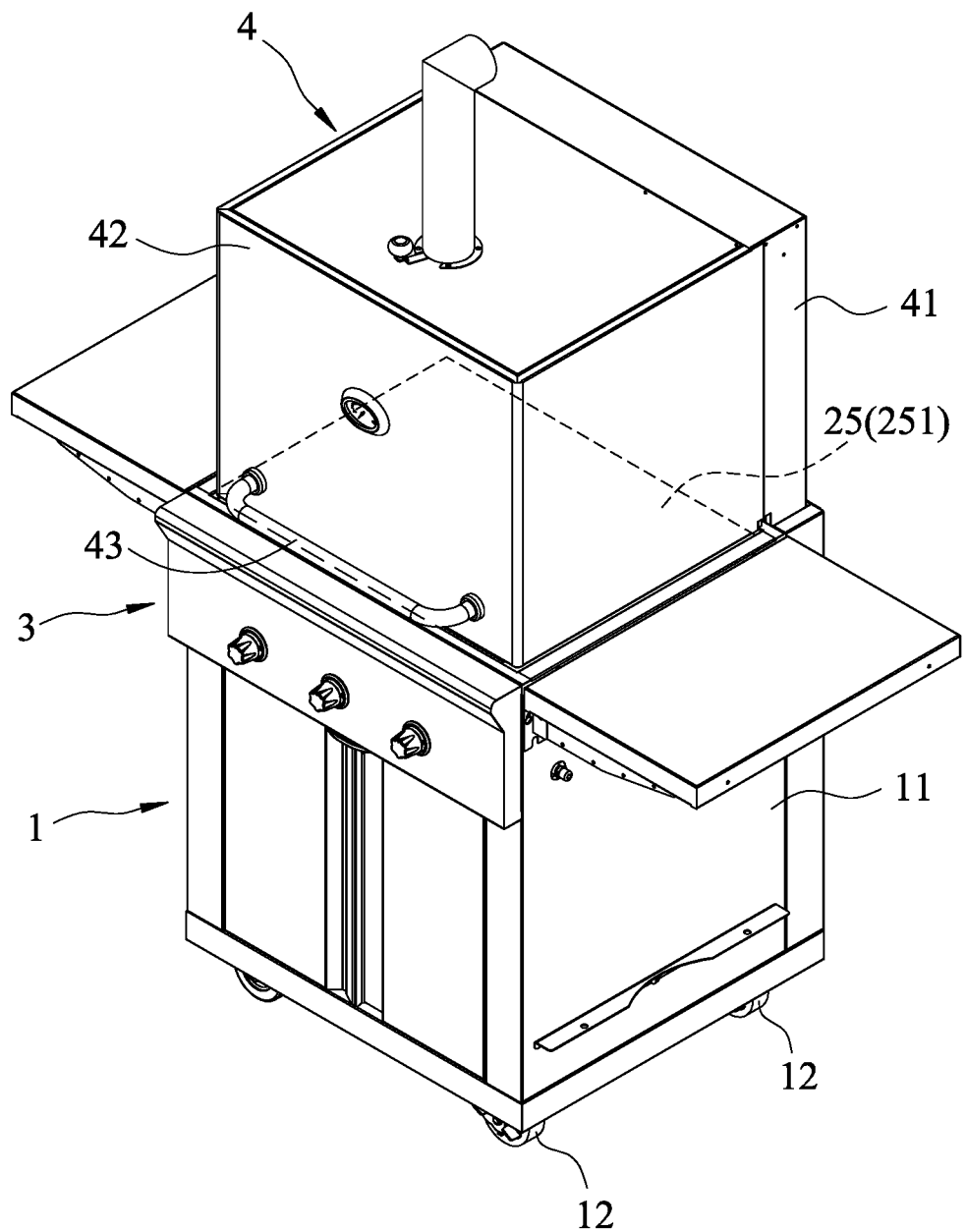
FIG. 6 is a view similar to FIG. 1, but illustrating the top cover at a covered position.

Referring to FIGS. 1 and 6, the cover unit 4 includes a guide rail seat 41, a top cover 42, and a handle 43. The guide rail seat 41 extends upwardly from the top end portion of the seat body 11 of the base seat 1. The top cover 42 is disposed on the guide rail seat 41, is movable relative to the top seat 1 between a lifted position (see FIG. 1) and a covered position (see FIG. 6). The handle 43 is disposed on an outer surface of the top cover 42 such that a user can hold the handle 43 to move the top cover 42 along the guide rail seat 41 between the lifted and covered positions. When the top cover 42 is at the lifted position, the top cover 42 is distal from the top seat 1. When the top cover 42 is moved to the covered position, the top cover 42 is proximate to the top seat 1 and covers the upper opening 251 of the receiving space 25, such that the food material placed on the grill plate 24 can be smoked.

With the above description, the advantages of the stove according to the present disclosure can be summarized in the following:

1. Due to the configuration of the surrounding wall 22, the user can place the grill grate 24 at the first position or the second position, such that the distance between the grill grate 24 and the gas tubings 31 can be adjusted to meet the user's requirement, thereby ensuring the food material to be properly cooked.

2. When the user moves the top cover 42 from the lifted position to the covered position, the stove according to the present disclosure is capable of smoking food.

3. The inverted v-shaped bottom wall 21 is designed to enable the oil dripped from the food material to flow smoothly thereon toward the oil-dripping holes 211, and to be collected effectively in the oil-collecting tray 13.

In the description above, for the purposes of explanation, numerous specific details have been set forth in order to provide a thorough understanding of the embodiment. It will be apparent, however, t one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects.

While the disclosure has been described in connection with what is considered the exemplary embodiment, it is understood that his disclosure is not limited to the disclosed embodiment but is intended to cover various arrangements included within the spirit and scope of the broadest interpretation so as to encompass all such modifications and equivalent arrangements.

What is claimed is:

1. A stove comprising:
   a base seat including a seat body, and a plurality of wheels that are disposed on a bottom end of said seat body;
   a top seat disposed on a top end portion of said seat body, and having
      a bottom wall,
      a surrounding wall that extends upwardly from a periphery of said bottom wall, that cooperates with said bottom wall to define a receiving space having an upper opening, and that has
         a first wall portion having a top segment that defines a first groove, and
         a second wall portion opposite to said first wall portion, and having
            a top segment that defines a second groove, and
            a lower segment that defines a retaining groove disposed below said second groove and opening toward said first wall portion,
      a support member that is disposed on said first wall portion of said surrounding wall at a position below said first groove and corresponding in height to said retaining groove, and
      a grill grate that is disposed at one of a first position, where said grill grate is distal from said bottom wall, and where opposite lateral ends of said grill grate are respectively retained in said first and second grooves, and a second position, where said grill grate is proximate to said bottom wall, and where one of said lateral ends of said grill grate is placed on said support member while the other one of said lateral ends of said grill grate is retained in said retaining groove; and
   a heating unit disposed immovably on said top seat and proximate to said bottom wall.

2. The stove as claimed in claim 1, wherein:
   said first wall portion further has a first inner surface, said support member being disposed on said first inner surface, said first inner surface having a portion that extends through said top segment of said first wall portion and that faces said first groove; and
   said second wall portion further has a second inner surface, said second inner surface having a top portion that extends through said top segment of said second wall portion, and that faces said second groove.

3. The stove as claimed in claim 2, wherein:
   said second inner surface further has a lower portion extending through said lower segment of said second wall portion, and that faces said retaining groove; and said lower portion of said second inner surface has
a lower surface section configured as a lower boundary of said retaining groove,
a lateral surface section configured as a lateral boundary of said retaining groove, and
an upper surface section configured as an upper boundary of said retaining groove.

4. The stove as claimed in claim 3, wherein said upper surface section of said lower portion of said second inner surface is inclined, and has an inner end and an outer end that is lower than said inner end.

5. The stove as claimed in claim 1, wherein:
said bottom wall of said top seat is formed with at least one oil-dripping hole in spatial communication with said receiving space; and
said base seat further includes an oil-collecting tray removably disposed on said seat body and disposed under said bottom wall of said top seat.

6. The stove as claimed in claim 5, wherein:
said bottom wall is inverted v-shaped;
said bottom wall is formed with two of said oil-dripping holes; and
said oil-dripping holes are respectively formed in opposite lateral end portions of said bottom wall.

7. The stove as claimed in claim 1 further comprising a cover unit including:
a guide rail seat that extends upwardly from said top end portion of said seat body of said base seat;
a top cover that is disposed on said guide rail seat, that is movable relative to said top seat between a lifted position, where said top cover is distal from said top seat, and a covered position, where said top cover is proximate to said top seat and covers said upper opening of said receiving space; and
a handle that is disposed on an outer surface of said top cover.

* * * * *